US012745058B2

(12) United States Patent
Raghavapudi et al.

(10) Patent No.: US 12,745,058 B2
(45) Date of Patent: Sep. 22, 2026

(54) VISUAL ASSISTANCE SYSTEM

(71) Applicants: Aarna Raghavapudi, Aurora, IL (US); Shivani Jambunathan, Aurora, IL (US); Ryan Cho, Aurora, IL (US)

(72) Inventors: Aarna Raghavapudi, Aurora, IL (US); Shivani Jambunathan, Aurora, IL (US); Ryan Cho, Aurora, IL (US)

( * ) Notice: Subject to any disclaimer, the term of this patent is extended or adjusted under 35 U.S.C. 154(b) by 689 days.

(21) Appl. No.: 17/846,758

(22) Filed: Jun. 22, 2022

(65) Prior Publication Data

US 2022/0417704 A1 Dec. 29, 2022

Related U.S. Application Data

(60) Provisional application No. 63/214,072, filed on Jun. 23, 2021.

(51) Int. Cl.

| | |
|---|---|
| ***H04W 4/02*** | (2018.01) |
| ***A61H 3/06*** | (2006.01) |
| ***G09B 21/00*** | (2006.01) |
| ***H04W 4/021*** | (2018.01) |
| ***H04W 4/029*** | (2018.01) |

(Continued)

(52) U.S. Cl.

CPC ............ *H04W 4/023* (2013.01); *A61H 3/061* (2013.01); *G09B 21/007* (2013.01); *H04W 4/021* (2013.01); *H04W 4/029* (2018.02); *H04W 4/38* (2018.02); *H04W 4/90* (2018.02);

(Continued)

(58) Field of Classification Search

CPC ..... H04W 4/023; H04W 4/021; H04W 4/029; H04W 4/38; H04W 4/90; A61H 3/061; A61H 2003/063; A61H 2201/01; A61H 2201/5058; A61H 2205/12; A61H 2201/1642; A61H 2201/165; A61H 2201/501; A61H 2201/5097; A61H 2201/5064; G09B 21/007; A43B 3/35; A43B 3/44; A43B 3/48; G01S 13/88; G01S 13/93; G01S 15/88; G01S 15/93; G01S 17/88; G01S 17/93

See application file for complete search history.

(56) References Cited

U.S. PATENT DOCUMENTS

| | | | | |
|---|---|---|---|---|
| 9,311,827 | B1 * | 4/2016 | Alqahtani ............ | G09B 21/007 |
| 2009/0240171 | A1 * | 9/2009 | Morris Bamberg . | A61B 5/0002 600/595 |

(Continued)

OTHER PUBLICATIONS

"ANCCOR GPS Shoes for Kids-shoes for kids with GPS tracking and wireless charging trackable in real time from any smartphone"—Indiegogo; https://www.indiegogo.com/projects/gps-shoes-for-kids-anccor-shoes#/ Oct. 4, 2022.

(Continued)

*Primary Examiner* — Brandon J Miller

(74) *Attorney, Agent, or Firm* — Merchant & Gould, P.C.

(57) ABSTRACT

A visual assistance system or distance and location detection system is provided. The system comprises a sensor detecting distance of objects in a user's path and alerting the user when an object is within a designated proximity to the user. The system further comprises a location detection system using GPS technology that tracks the user's location and issues an alert to the user or other individual when the user's location exceeds the boundaries of a designated safe zone.

20 Claims, 4 Drawing Sheets

(51) Int. Cl.
*H04W 4/38* (2018.01)
*H04W 4/90* (2018.01)

(52) U.S. Cl.
CPC .... *A61H 2003/063* (2013.01); *A61H 2201/01* (2013.01); *A61H 2201/5058* (2013.01); *A61H 2205/12* (2013.01)

(56) References Cited

U.S. PATENT DOCUMENTS

| | | | | |
|---|---|---|---|---|
| 2015/0356837 | A1* | 12/2015 | Pajestka | A61H 3/061<br>340/4.14 |
| 2018/0185232 | A1* | 7/2018 | Namdar | H04W 4/024 |
| 2019/0240171 | A1* | 8/2019 | Cheah | C07C 235/20 |
| 2019/0364510 | A1* | 11/2019 | Bonazzoli | H04W 52/0277 |
| 2020/0113271 | A1* | 4/2020 | Kramer | H04R 1/028 |
| 2020/0293776 | A1* | 9/2020 | Raffer | G09B 21/003 |
| 2021/0236022 | A1* | 8/2021 | Shugert | A61B 5/1128 |
| 2021/0236378 | A1* | 8/2021 | Petersen | A61H 3/061 |
| 2022/0264987 | A1* | 8/2022 | Kudymov | G08B 21/0461 |

OTHER PUBLICATIONS

Margaret Davis, "$3,840 smart shoe helps blind, visually impaired people with its ultrasonic sensors that avoid obstacles", May 6, 2021, The Science Times, Copyright 2022; https://www.sciencetimes.com/articles/31040/20210506/3840-smart-shoe-helps-blind-visually-impaired-people-ultrasonic-sensor.htm. Oct. 4, 2022.

"MindCare, GPS Smart Sole Wandering Prevention—discreet solution for tracking a loved-one's location who has Alzheimer's or memory loss". https://www.mindcarestore.com/gps-smart-sole-alzheimers-p/mc-2026.htm?msclkid=9701c3ca13b012fd1544a306e803bbbc. Oct. 4, 2022.

* cited by examiner

VISUAL ASSISTANCE SYSTEM

CROSS REFERENCE TO RELATED APPLICATIONS

This application claims the benefit of U.S. Provisional Application No. 63/214,072, filed Jun. 23, 2021, the entire contents of which are incorporated herein by reference.

FIELD OF THE INVENTION

This disclosure relates generally to sensors and other electronic modules that can be integrated with footwear or other objects to alert a user when they are approaching an object in their path. Additionally, alerts for a user or other individual when the user approaches or exceeds predefined safe zones also are described.

BACKGROUND

Visually impaired individuals often feel frustrated and frightened when they unexpectedly encounter objects in their path. Bumping into unexpected objects is a safety hazard and existing implements for aiding mobility may create a social barrier between sighted and visually impaired individuals. Studies have found that those who are visually impaired often experience higher levels of depression, low self-esteem, and loneliness. To reduce the number of accidents, it is vital that individuals, including but not limited to visually impaired individuals, have a system that offers an alert when they are approaching an object in their path or walking outside of designated safe zones.

Existing tools for the visually impaired are not inconspicuous, and often further the social barriers visually impaired individuals experience. One of the most common existing tools for the visually impaired are white canes, which were popularized and refined when veterans returned home blinded from World War II. Though white canes are reliable and easily accessible, they do not take advantage of today's technology. Canes are also often cumbersome for the visually impaired. Other tools for visually impaired individuals include guide dogs and human guides. However, many visually impaired individuals do not have access to guide dogs or human guides due to various reasons, including cost.

This disclosure seeks to aid the visually impaired using visual assistance system based on distance-detection sensor and GPS technology. However, this technology is not limited to visually impaired individuals as others may find it useful. For instance, the safe zone feature may be used to monitor the movements of young children or individuals suffering from memory disorders. Sensors can be easily integrated with footwear or other products and are less cumbersome and resource-intensive than existing visual-assistance tools. Existing sensor footwear technology for the visually impaired is quite costly, so this disclosure seeks to create a cost-effective product that is still reliable, accurate, fast, and inconspicuous.

SUMMARY

Various aspects of this disclosure relate to distance detections systems that include electronic modules, e.g., for sensing distance to objects in front of the user, and electronic location modules, e.g., for determining the user's location in relation to designated GPS coordinates. More specific aspects of this disclosure relate to (a) at least one distance-detection sensor that can be removably affixed or permanently affixed to the front or other positions on footwear or other objects; (b) a programmable location detection system using GPS coordinates to determine the location of the user; (c) an alert system that notifies the user or other individual when the user is within a certain designated proximity of an object in their path, and (d) an alert system that notifies the user or other individual when the user reaches and exceeds the boundaries of a designated safe zone, as defined by specified GPS coordinates. The foregoing specific aspects of the disclosure provide the user with the opportunity to avoid potential accidents and can potentially improve quality of life for visually impaired or other individuals.

BRIEF DESCRIPTION OF THE DRAWINGS

A more complete understanding of the aspects of the present disclosure and at least some features and advantages thereof may be acquired by referring to the following description and accompanying drawings, in which the reference numbers indicate like features throughout, and wherein.

DETAILED DESCRIPTION

In the following description of various examples of the present disclosure, reference is made to the accompanying drawings, which form a part hereof, and in which are shown by way of illustration various structures, embodiments, examples, and environments relating to aspects of the present disclosure. It is to be understood that other structures, embodiments, examples, and environments may be utilized, and structural and functional modifications may be made to the various systems and methods described herein without departing from the scope of the present disclosure.

The term "footwear" as used herein may mean any product worn on the feet, and includes, but is not limited to: all types of shoes, boots, sneakers, mules, slippers, sandals, or sport-specific shoes. As described herein, however, aspects of this disclosure may be used in conjunction with any personal object or wearable product, including, but not limited to: canes, wheelchairs, luggage, shopping carts, bracelets, hats, necklaces or other items that may or may not be carried with or worn by an individual. The term "footwear" should be understood to also include these other personal objects to which at least one sensor and electronic module may be removably affixed or permanently affixed.

Though these are many possible embodiments of the present disclosure and capabilities, this detailed description will highlight possible embodiments for both the distance detection system and the GPS location alert system.

Figure 1:
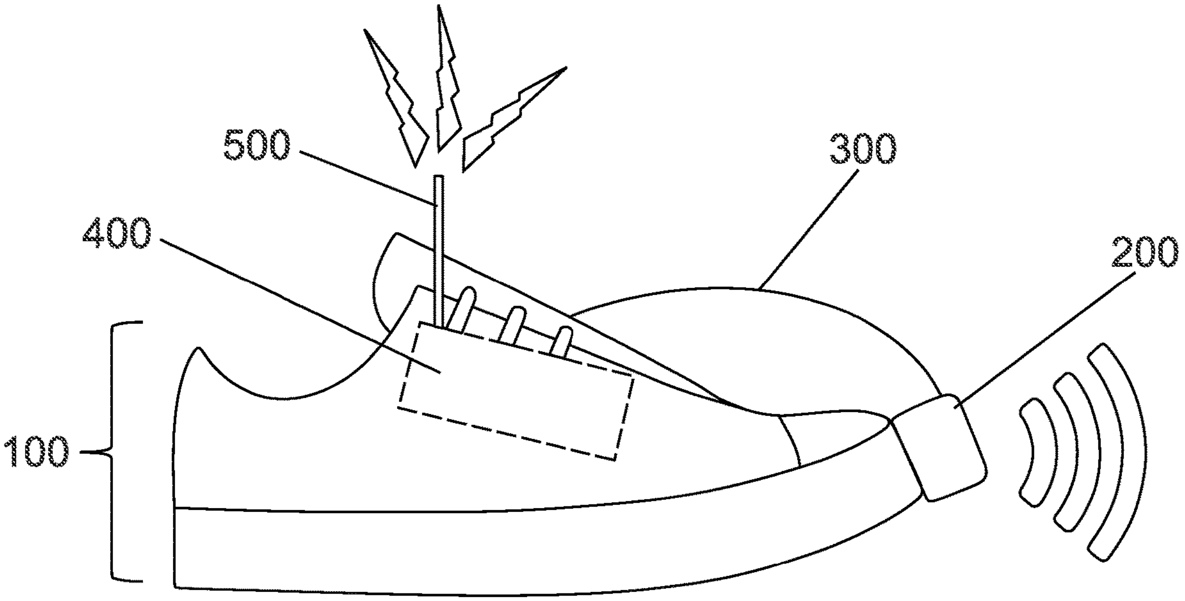
FIG. 1 illustrates an example embodiment in which a distance sensor is affixed to the front of a shoe, providing information to an electronic module inside the shoe, and location information is transmitted and received through an antenna.

Aspects of the present disclosure generally relate to a distance detection system that involves sensors that may be removably affixed or permanently affixed to footwear or other objects to assist users to detection of objects or obstacles in their proximity. As shown in FIG. 1., which generally illustrates an example of the disclosure and some of its possible capabilities, an individual may take an article of footwear 100 and affix to the front end of the footwear 100 at least one distance sensor 200. In alternative embodiments, distance sensor 200 may be removably affixed or permanently affixed to the sides, the heel, or other positions on footwear 100. In further embodiments, the user may fix a plurality of distance sensors 200 to footwear 100. This disclosure is not limited to the use of only one distance sensor 200. It is understood that distance sensor 200 is not limited to one specific distance sensor technology, and could include, but is not limited to, ultrasonic sensors, laser distance sensors such as Lidar, infrared sensors, radar, LED time-off light, sonar, capacitive, capacitive displacement, doppler, inductive, optical, photoelectric, photocell, laser range finder, fiber optic, and Hall effect sensors. Distance sensor 200 detects objects located in front of the user's footwear 100 or other object on which distance sensor 200 is removably affixed or permanently affixed.

Figure 2:
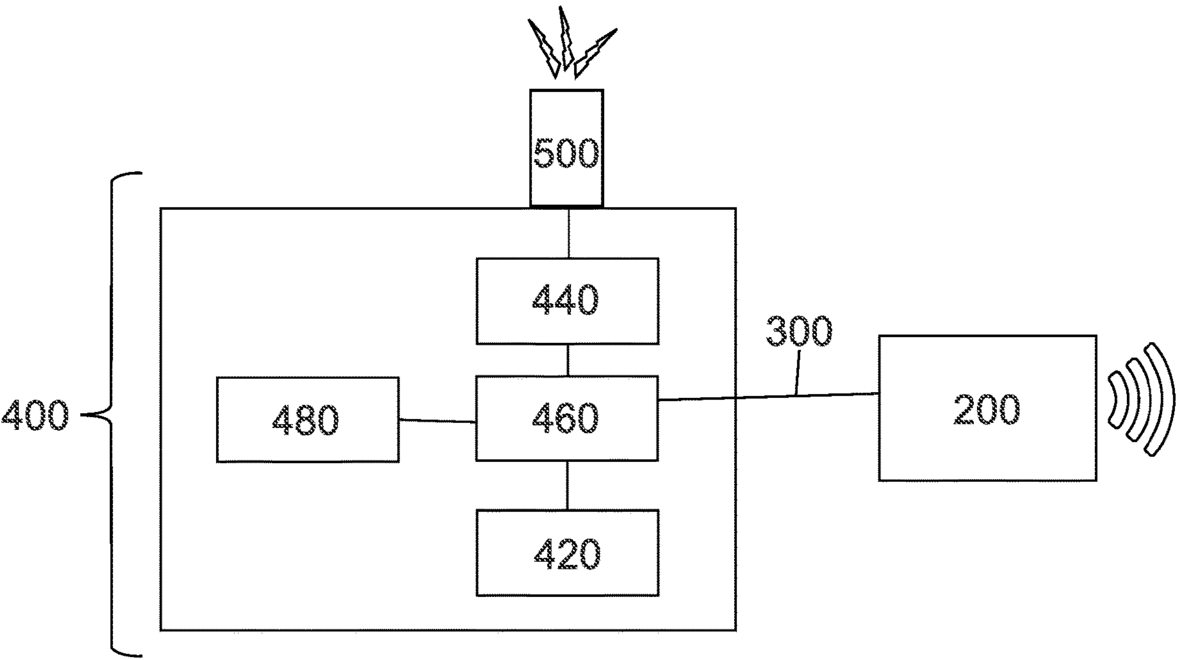
FIG. 2 illustrates a schematic block diagram of an example electronic module that may be used, e.g., for alerting a user when they are in proximity to an object or when they are leaving designated GPS coordinate zones.

Distance sensor 200 is optionally connected to at least one optional connection wire 300. In other embodiments, distance sensor 200 is wireless. As shown in FIG. 1 and FIG. 2, the at least one optional connection wire 300 may protrude from the outside of footwear 100. In alternative embodiments, the at least one optional connection wire 300 may be located instead on the inside of footwear 100, removably affixed or permanently affixed to the outside of footwear 100, or included in footwear 100 fabric by incorporation into a conductive thread.

Figure 3:
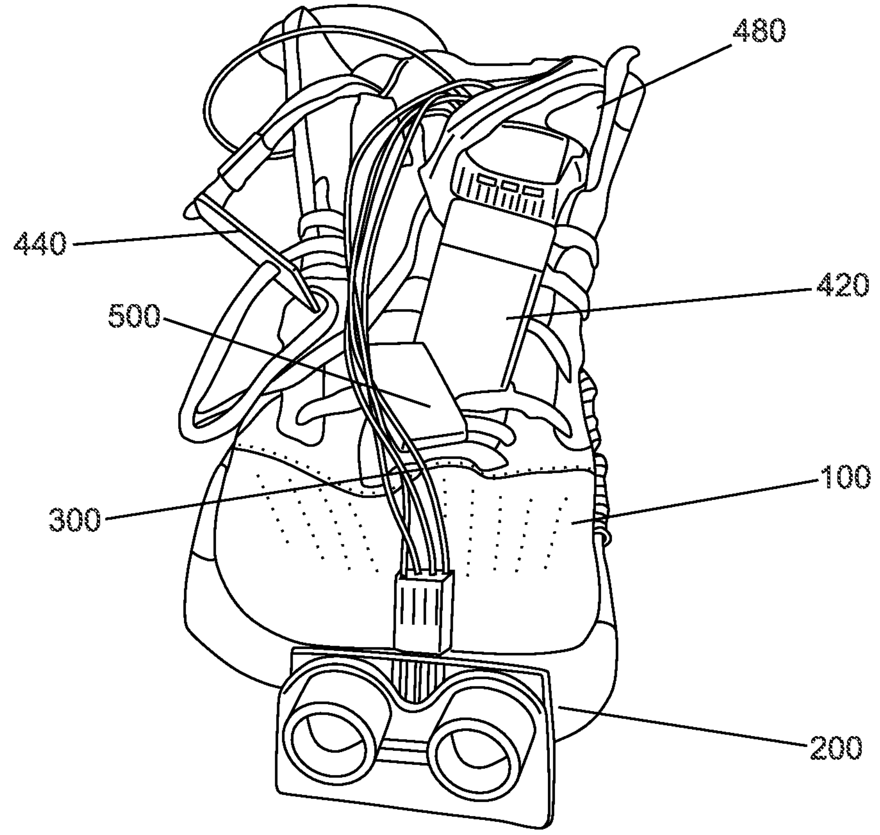
FIG. 3 illustrates an example embodiment in which a distance sensor is affixed to the front of the shoe, and the electronic module rests on top of the shoe.

As shown in FIG. 1, FIG. 2, and FIG. 3, an optional connection wire 300 may optionally be attached to microcontroller 460. In other embodiments, microcontroller 460 is wireless. Microcontroller 460 is one of several components comprising electronic module 400. As illustrated in FIG. 1, electronic module 400 may be located inside of footwear 100 for example in the sole, heal, or toe box of the footwear. FIG. 3 illustrates an alternative embodiment, in which electronic module 400 rests on top of footwear 100. As FIG. 2 illustrates, electronic module 400 may be, in some embodiments, comprised of microcontroller 460, GPS module 440, power source 420, and alert system 480.

In one embodiment, microcontroller 460 may be a microcontroller board, equipped with sets of digital and analog input/output pins. In alternative embodiments, microcontroller 460 may be a microprocessor, microprocessor-based minicomputer, or other firmware. Microcontroller 460 is programmable. Microcontroller 460 can be programmed to designate a distance for sensor detection, e.g., the distance at which an object must be located from the user when the user will be alerted to its presence, up to 450 centimeters. In other embodiments, microcontroller 460 can be programmed to designate a distance for sensor detection between 400-450 centimeters. In some embodiments, microcontroller 460 can be programmed to designate a distance for sensor detection between 350-500 centimeters. In other embodiments, microcontroller 460 can be programmed to designate a distance for sensor detection below 300 centimeters. In other embodiments, microcontroller 460 can be programmed to designate a distance for sensor detection more than 450 centimeters. Microcontroller 460 receives power from power source 420. In one possible embodiment, as illustrated in FIG. 3, power source 420 may be a rechargeable battery, a removable battery, or disposable battery. Power source 420 should be replaced or recharged as needed.

When distance sensor 200 detects an object within the designated proximity to the user, distance sensor 200 will share such information with microcontroller 460 via at least one optional connection wire 300. In other embodiments distance sensor 200 will share such information with microcontroller 460 wirelessly. Microcontroller 460 will then trigger alert system 480. Alert system 480 has many possible embodiments and may, in some embodiments, be programed to the user's preferences. For example, in some embodiments, alert system 480 will use a vibrational alert system to alert the user that an object is within the designated proximity. In other embodiments, alert system 480 will use a buzzer, alarm, voice recording, music, tone, text message, phone call, or other technology to emit an auditory tone alert to alert the user that an object is within the designated proximity. In alternative embodiments, the alert system will communicate with an external system such as a computer program, text message, email, mobile software application, Amazon Alexa, home sound system, security system, Life Alert, or automated telephone call.

Figure 4:
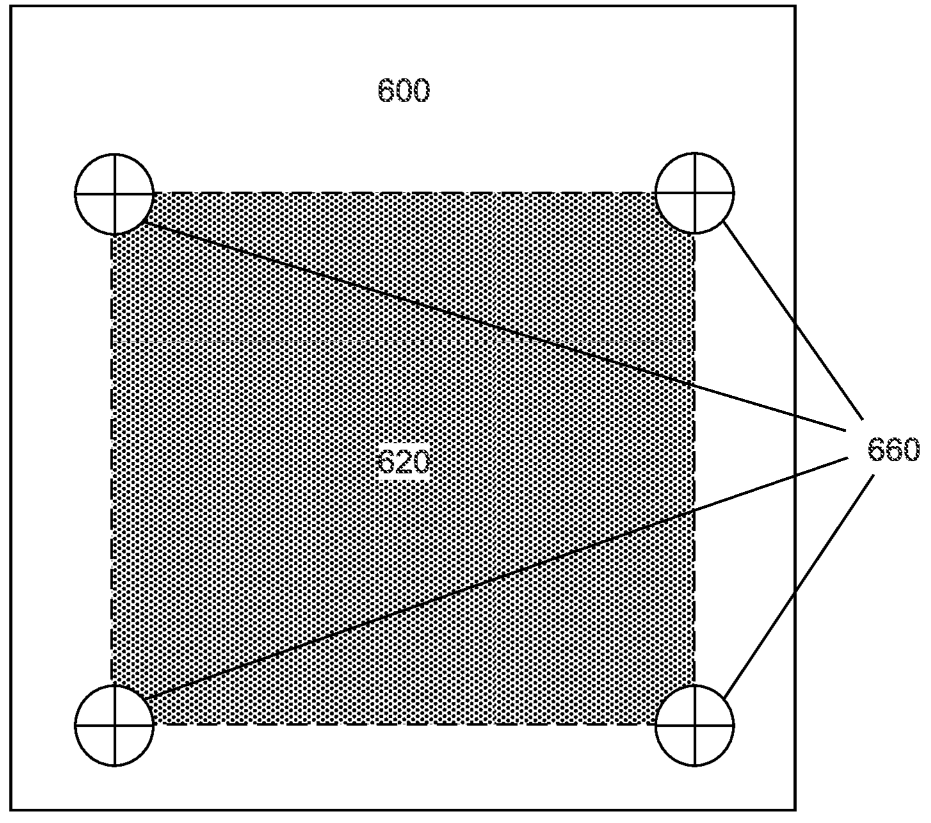
FIG. 4 illustrates an example embodiment in which GPS coordinates are determined at the four corners to designate a safe zone area for the location-detection feature.

Aspects of this disclosure also involve a location alert system that involves the capability to alert a user or other individual when the user leaves a designated safe zone. FIG. 4 illustrates how a safe zone is established in one possible embodiment. Within total plot 600, the user or other individual may wish to designate safe zone 620. The user or other individual can designate safe zone 620 by recording GPS coordinates at the boundaries of safe zone 620. In one possible embodiment, illustrated in FIG. 4, the user or other individual can determine boundary coordinates 660 at the four corners of safe zone 620, although alternative boundary determinations options are available. The four corners of the safe zone 620 can be determined by using an app, Google Maps, Garmin, Apple Watch, compass, or other technology. In such embodiment, the boundaries of safe zone 620 will span boundary coordinates 660 to define a perimeter of safe zone 620. In example embodiments, safe zone 620 may be, but is not limited to, a backyard, a school property, a house interior, an area adjacent to water, such as a pool or a lake, a neighborhood, or other plot of land.

As FIG. 2 illustrates, in one embodiment, electronic module 400 comprises GPS module 440. GPS module 440 may be connected to a corresponding antenna 500. As FIG. 1 illustrates, antenna 500 may protrude from footwear 100 in some embodiments. It is to be understood that antenna 500, in other embodiments, may be located inside or exterior to footwear 100.

Antenna 500 can communicate with the user or other individual by transmitting information via GPS satellite. Through this information sharing, antenna 500 can detect when the user's location exceeds safe zone 620. Antenna 500 may also communicate to a cell phone, for example by communicating a voice call or text message. Antenna 500 then communicates to GPS module 440 that the user has reached or exceeded the boundaries of safe zone 620. This information is then communicated to microcontroller 460, which then triggers alert system 480. Alert system 480 has many possible embodiments and may, in some embodiments, be adjusted based on the user's preferences. For example, in some embodiments, alert system 480 will use a vibrational alert system to alert the user that an object is within the designated proximity. In other embodiments, alert system 480 will use a buzzer, alarm, voice recording, music, tone, text message, phone call, or other technology to emit an auditory tone alert to alert the user that an object or visual is within the designated proximity.

In additional embodiments, an individual who is not the user may be notified that the user has exceeded the boundaries of safe zone 620. Microcontroller 460 may be programmed to provide a remote notification is transmitted to a parent or other individual through a mobile application. In alternative embodiments, the parent or other individual may receive a remote notification that is transmitted to a computer program, text message, email, Amazon Alexa, home sound system, security system, Life Alert, or automated telephone call. However, notifications are not limited to these means and other forms of notification are possible.

The above specification, examples and data provide a complete description of the manufacture and use of the invention. Many embodiments of the invention can be made without departing from the spirit and scope of the invention.

What is claimed is:

1. A visual assistance system for visually impaired individuals consisting of:

(a) a shoe;

(b) a plurality of ultrasonic distance-detection sensors affixed to the shoe, wherein at least one ultrasonic distance-detection sensor is located at the front of the shoe and at least one ultrasonic distance-detection sensor is located on the side or heel of the shoe;

(c) a programmable location detection system comprising a global-positioning system module in the interior of the shoe;

(d) a programmable microcontroller in the interior of the shoe and configured to coordinate real-time data processing from both the plurality of ultrasonic distance-detection sensors and the programmable location detection system;

(e) an alert system in the interior of the shoe and in communication with both the plurality of ultrasonic distance-detection sensors and the programmable location detection system, wherein the alert system provides vibrational alerts directly to a user of the shoe based on inputs from both the plurality of ultrasonic distance-detection sensors and the programmable location detection system;

(f) an antenna configured for global-positioning system satellite communication; and (g) optionally, a power source.

2. The visual assistance system of claim 1, wherein the programmable microcontroller is connected to the plurality of ultrasonic distance-detection sensors by at least one connection wire.

3. The visual assistance system of claim 1, wherein the alert system comprises an auditory tone alert.

4. The visual assistance system of claim 1, wherein the alert system comprises communication to an external system.

5. The visual assistance system of claim 4, wherein the external system is selected from the group consisting of a computer program, a text message, an email, a mobile software application, a home sound system, a security system, a virtual assistant, or an automated telephone call.

6. The visual assistance system of claim 1, wherein the programmable microcontroller is further programmed to transmit a remote notification.

7. The visual assistance system of claim 6, wherein the remote notification is transmitted to a mobile application.

8. The visual assistance system of claim 1, wherein the programmable location detection system is programmed to define a safe zone.

9. The visual assistance system of claim 8, wherein the safe zone is defined using one or more global-positioning system coordinates.

10. The visual assistance system of claim 1, wherein the plurality of ultrasonic distance-detection sensors are positioned on the front, sides, and heel of the shoe.

11. The visual assistance system of claim 1, wherein the programmable microcontroller is wirelessly connected to the plurality of ultrasonic distance-detection sensors.

12. The visual assistance system of claim 1, wherein the plurality of ultrasonic distance-detection sensors detect a distance between 350-500 centimeters.

13. The visual assistance system of claim 1, wherein the plurality of ultrasonic distance-detection sensors detect a distance between 400-450 centimeters.

14. The visual assistance system of claim 1, wherein the plurality of ultrasonic distance-detection sensors detect a distance of less than 300 centimeters.

15. The visual assistance system of claim 1, wherein the plurality of ultrasonic distance-detection sensors detect a distance of greater than 450 centimeters.

16. The visual assistance system of claim 1, wherein the power source is selected from the group consisting of a rechargeable battery, a removable battery, or a disposable battery.

17. The visual assistance system of claim 1, wherein the shoe is selected from the group consisting of boots, sneakers, mules, slippers, sandals, and sport-specific shoes.

18. A safety alert shoe for visually impaired individuals consisting of:

(a) a shoe;

(b) a plurality of ultrasonic distance-detection sensors wherein at least one ultrasonic distance-detection sensor is located at the front of the shoe and at least one ultrasonic distance-detection sensor is located on the side or heel of the shoe;

(c) a programmable location detection system in the interior of the shoe and comprising a global-positioning system module integrated with the shoe;

(d) a programmable microcontroller in the interior of the shoe and configured to process real-time data from the plurality of ultrasonic distance-detection sensors and the programmable location detection system;

(e) a vibrational alert system in the interior of the shoe and in communication with both the plurality of ultrasonic distance-detection sensors and the programmable location detection system and configured to alert the user wearing the shoe through coordinated processing of data from the plurality of ultrasonic distance-detection sensors and the programmable location detection system;

(f) an antenna integrated with the shoe for global-positioning system communication; and (g) optionally, one or more connection wires for connecting the programmable microcontroller to the plurality of ultrasonic distance-detection sensors.

19. A method of providing assistance to a visually impaired individual consisting of:

(a) sensing if an object is within a designated proximity from the individual using a plurality of ultrasonic distance-detection sensors positioned on a shoe worn by the individual, wherein at least one ultrasonic distance-detection sensor is located at the front of the shoe and at least one ultrasonic distance-detection sensor is located on the side or heel of the shoe, and the designated proximity is less than 450 centimeters;

(b) monitoring the individual's location using a programmable location detection system comprising a global-positioning system module integrated with the interior of the shoe;

(c) coordinating real-time data from both the plurality of ultrasonic distance-detection sensors and the programmable location detection system using a programmable microcontroller in the interior of the shoe;

(d) notifying an alert system in the interior of the shoe based on real-time data from both the plurality of ultrasonic distance-detection sensors and the programmable location detection system;

(e) alerting the individual wearing the shoe using a vibration based on the processing of data from both the plurality of ultrasonic distance-detection sensors and the programmable location detection system; and (f) optionally, establishing a designated safe zone by recording global-positioning system coordinates at four boundary corners using at least one of a mobile application, global-positioning system technology, or an Internet-based map website.

20. The method of claim 19, wherein the alert is provided through a mobile application.

* * * * *